United States Patent
Cline et al.

(10) Patent No.: US 6,704,877 B2
(45) Date of Patent: Mar. 9, 2004

(54) DYNAMICALLY CHANGING THE PERFORMANCE OF DEVICES IN A COMPUTER PLATFORM

(75) Inventors: Leslie E. Cline, Sunnyvale, CA (US); Varghese George, Folsom, CA (US); David Wyatt, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 471 days.

(21) Appl. No.: 09/751,530

(22) Filed: Dec. 29, 2000

(65) Prior Publication Data

US 2002/0087897 A1 Jul. 4, 2002

(51) Int. Cl.[7] .............................. G06F 1/00
(52) U.S. Cl. .................... 713/320; 713/323; 713/300
(58) Field of Search ................ 713/300, 320, 713/323, 324, 340

(56) References Cited

U.S. PATENT DOCUMENTS

| | | | |
|---|---|---|---|
| 5,021,679 A | | 6/1991 | Fairbanks et al. |
| 5,153,535 A | | 10/1992 | Fairbanks et al. |
| 5,307,003 A | | 4/1994 | Fairbanks et al. |
| 5,560,022 A | * | 9/1996 | Dunstan et al. ............ 713/300 |
| 5,627,412 A | | 5/1997 | Beard |
| 5,630,148 A | * | 5/1997 | Norris ...................... 713/300 |
| 5,737,615 A | * | 4/1998 | Tetrick ...................... 713/330 |
| 5,752,011 A | | 5/1998 | Thomas et al. |
| 5,974,557 A | | 10/1999 | Thomas et al. |
| 6,105,142 A | * | 8/2000 | Goff et al. .................. 713/324 |
| 6,216,235 B1 | | 4/2001 | Thomas et al. |
| 6,266,776 B1 | * | 7/2001 | Sakai ........................ 713/300 |
| 6,272,642 B2 | * | 8/2001 | Pole, II et al. .............. 713/300 |
| 6,457,135 B1 | * | 9/2002 | Cooper ...................... 713/323 |
| 6,487,668 B2 | | 11/2002 | Thomas et al. |
| 6,535,798 B1 | * | 3/2003 | Bhatia et al. ................ 700/293 |

OTHER PUBLICATIONS

Authors, Edwin J. Pole, II, Scott R. Rushford, Eric S. Swartzendruber, And Xia Dai, titled Managing A System's Performance State, U. S. patent application, 33 pages. Filed Dec. 3, 1998.

Author, Xia Dai, titled Method and Apparatus to Enhance Processor Power Management, U.S. patent application, 26 pages. Filed Sep. 30, 2000.

Author, Tony Hamilton, titled Method and Apparatus for Providing Dynamical Scalability, U.S. patent application, 20 pages. Filed Sep. 30, 2000.

* cited by examiner

*Primary Examiner*—Paul R. Myers
*Assistant Examiner*—Raymond N Phan
(74) *Attorney, Agent, or Firm*—John F. Travis

(57) ABSTRACT

A device controller can have multiple device performance states (DPS), which represent different levels of performance vs. power consumption during operation. The device controller can include a DPS status register that can be read by a processor, to indicate the current DPS, and a DPS control register that can be written by the processor, to change the current DPS to a desired DPS. The controller may also have a processor performance state (PPS) status register which can be used to affect the desired choice of DPS based on the performance state of the processor. Each of the registers can be accessed by the device driver for that device controller. The DPS of multiple devices can be coordinated to achieve an improved system-level reduction in power consumption, while maintaining sufficient operational capability.

21 Claims, 4 Drawing Sheets

DYNAMICALLY CHANGING THE PERFORMANCE OF DEVICES IN A COMPUTER PLATFORM

BACKGROUND OF THE INVENTION

1. Field of the Invention

The invention pertains generally to computers. In particular, it pertains to managing device power states in computers.

2. Description of the Related Art

In an effort to conserve energy, computer systems have increasingly begun to implement low-power states, in which various techniques are used to reduce power consumption. This is especially true in battery-powered systems, in which reduced power consumption produces increased operational time between battery charges. These power reduction efforts have been targeted at various levels of the computer systems, ranging from the entire system to individual devices. Various power states have been defined to provide common terminology in power reduction efforts. States S0 through S5 define system level power states, with S0 being fully operational. S1–S5 define non-operational levels of progressively decreasing power consumption and progressively longer times to recover full operation when returning to the S0 state. States D0 through D3 define similar states for devices, such as disk drives, displays, etc., with D0 indicating fully operational and D1–D3 indicating progressively d e creasing power consumption and progressively longer times to recover full operation when returning to the D0 state. These terms define just one operational state for a device, the D0 state, with the remaining states defining various levels of low-power consumption in a non-operational mode. Thus the power management system, whatever form it might take, primarily needs to choose between operation and non-operation for each power-managed device at any given time. Secondary considerations may then be evaluated to determine how quickly the device must respond when it is returned to an operational status, and that evaluation determines which low-power state to enter.

However, some devices are suitable for various levels of reduced-power performance in the operational state. For example, the backlight of a liquid crystal display (LCD) device can be turned off without disabling the pixel control of the display. Similarly, the transmission circuits of a modem could be placed in a low power state until a transmission is to be made, while leaving the receive circuits fully operational to receive any incoming data. These power controls are generally placed in the hardware, and are based on hardware timers and hardware signals that signify an event that must be responded to. The software generally has no insight into these partial-power states, and no control over them. Since these are independent states with independent logic, there is no overall control of the device power management system. Any device interdependencies (i.e., one device won't operate correctly while another is in a given low power state) are not comprehended, and the operating system cannot provide comprehensive power management control because it is unaware of the current operating levels of all the various devices.

Unfortunately, the power management systems of most computers are not set up to provide such comprehensive power control over device operational states. Both the hardware and software to provide this comprehensive control are missing in a conventional system.

DETAILED DESCRIPTION OF THE INVENTION

The invention provides a way to monitor and control the individual device performance states of multiple devices in a computer system, and permits integrated power management of all the devices at the system level. A device performance state (DPS) is an operational state for a device, rather than a non-operational idle state, with each device performance state defining a particular performance level for that device. In one embodiment, the performance state can also be applied to at least a portion of the device controller itself. A given performance state can include a particular combination of various performance-affecting parameters, such as (but not limited to) clock speed, voltage level, or the removal of power from one or more circuits. Each of these things can be used to reduce power consumption during operation, but this reduced power consumption is generally accompanied by reduced performance. Thus a range of performance states can be defined, with each state defining a different point in the power/performance tradeoff. Since different devices can have vastly different operating characteristics, specific performance states can be custom-defined for each device. Although various examples may be given herein of various devices and their performance states, these are for example only and should not be interpreted as an attempt to limit the invention to any particular device or set of performance states.

Figure 1:
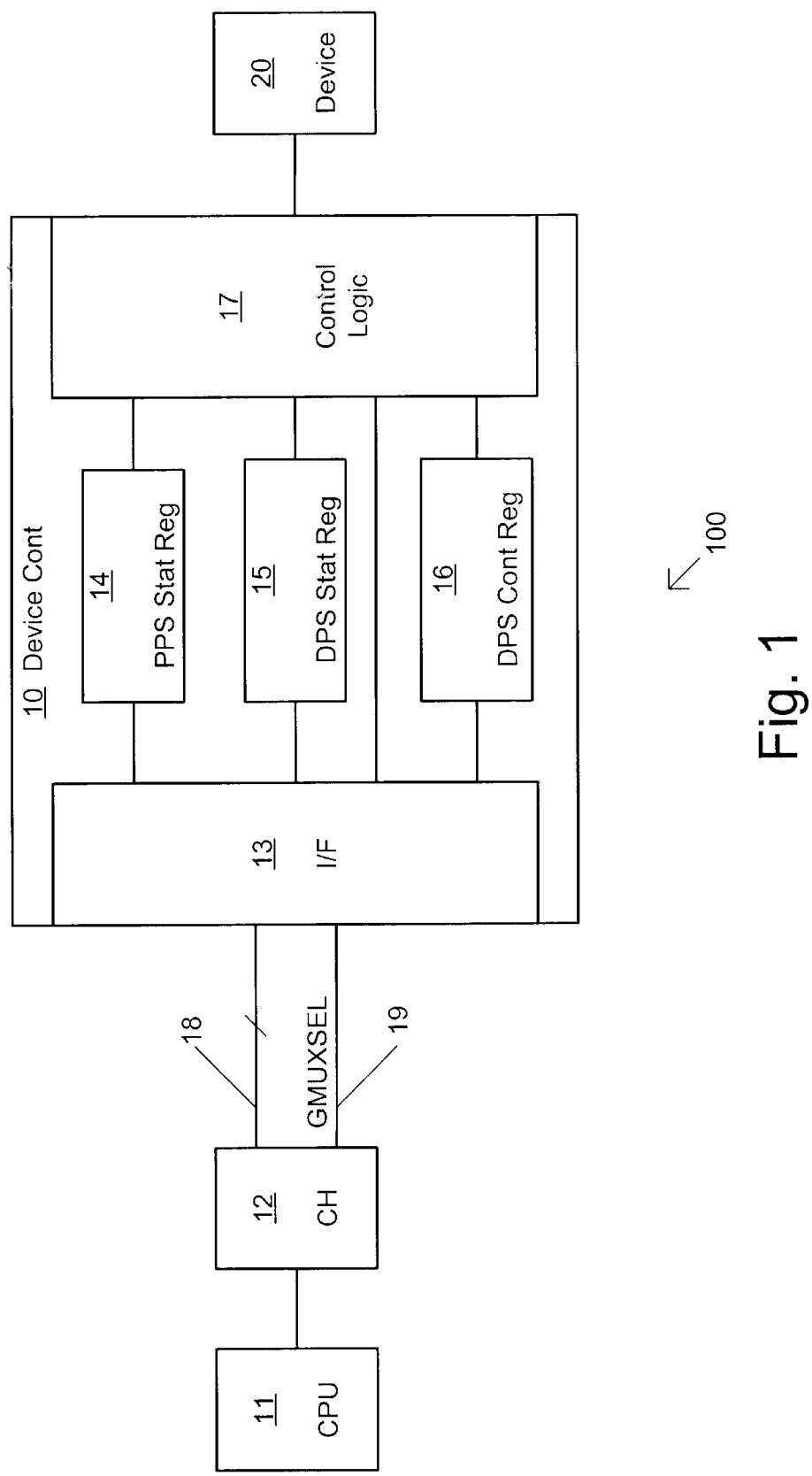
FIG. 1 shows a device controller for managing operational power states.

FIG. 1 shows a system 100 containing a device controller 10 that controls a device 20. The device can be any of various devices, such as, but not limited to, a disk drive, a display device, a modem, a graphics accelerator, a network interface, or a keyboard. Device controller 10 can include an interface 13, that permits control and data signals to flow between device controller 10 and a processor (CPU) 11. A controller hub (CH) 12 may be inserted between CPU 11 and interface 13 to facilitate this connection with minimal burden on CPU 11. Various control and data lines 18 can be used to perform communications between controller hub 12 and device controller 10.

Device controller 10 can also include control logic 17 to provide overall control of device 20. Control logic 17 can be designed for the particular type of device 20 that is being controlled. For the most part, control logic 17 can include standard circuits to control the device, but can also include power control and/or status lines to control and monitor the various performance states that the device is capable of executing.

To permit multiple performance states to be incorporated into the device, device controller 10 can also include several registers that can be used for this purpose. Device performance state (DPS) control register 16 can be written into by CPU 11 to indicate the desired performance state that device 20 should be placed into. The contents of this register can be sensed by control logic 17, which can then place device 20 into the desired performance state. In this manner, the device driver can exercise control over the performance state that device 20 is in by writing into DPS control register 16, and the operating system can exercise some control over this by sending suitable commands to the device driver.

DPS status register 15 can be written into by control logic 17 to indicate the current performance state that device 20 is in. This register can then be read by CPU 11 to determine what state device 20 is in. In this manner, the device driver can determine what the current performance state of device 20 is by reading device status register 15, and the operating system can also determine the current state by querying the device driver.

Status register 15 and control register 16 can be dedicated to the aforementioned functions. Alternately, they can be multi-purpose registers, each with a field dedicated to the aforementioned functions, and also containing other fields that can be used for other purposes.

In addition to DPS registers 15 and 16, processor performance state (PPS) status register 14 can be used to communicate to the device controller the current performance state of the processor. The functions that can be performed by a device may depend on the performance state of CPU 11. For example, if the CPU is placed in its own low-performance state, it might become incompatible with the operation of device 20, which could then be placed into its own low-performance state to match the capabilities of the CPU. If the CPU is returned to a high-performance state, as indicated by the contents of PPS status register 14, controller 10 can return device 20 to a high performance state to match the CPU's improved performance. In one embodiment, a signal line 19 can carry a GMUXSEL signal to inform device controller 10 whether CPU 11 is operating at a standard voltage level, or at a reduced voltage level that implies a reduced-power performance state. Based on this, device 20 can be placed in a matching lower-performance state, or even a non-operational state if appropriate. The state of GMUXSEL can be fed directly into a particular bit of PPS status register 14, and control logic 17 can use this bit to automatically control at least one performance state of device 20 without direct software intervention. In another embodiment, this bit can be read by the device driver, and the value of this bit can be combined with other information to control the device performance state through software. In still another embodiment, a change in the state of GMUX-SEL can trigger an interrupt, and the interrupt can be used to trigger a device performance state change. The interrupt service routine can be redirected to the device driver, which can take the appropriate performance control actions. In one embodiment, the operating system or device driver software is capable of managing the device performance state without external assistance, so the GMUXSEL information can be ignored. For flexibility, any or all of these various uses of GMUXSEL can be combined in the same system.

Thus the registers 14, 15 and 16 can be used to monitor device and processor performance states, and control device performance states, using the software being executed by CPU 11.

Figure 2:
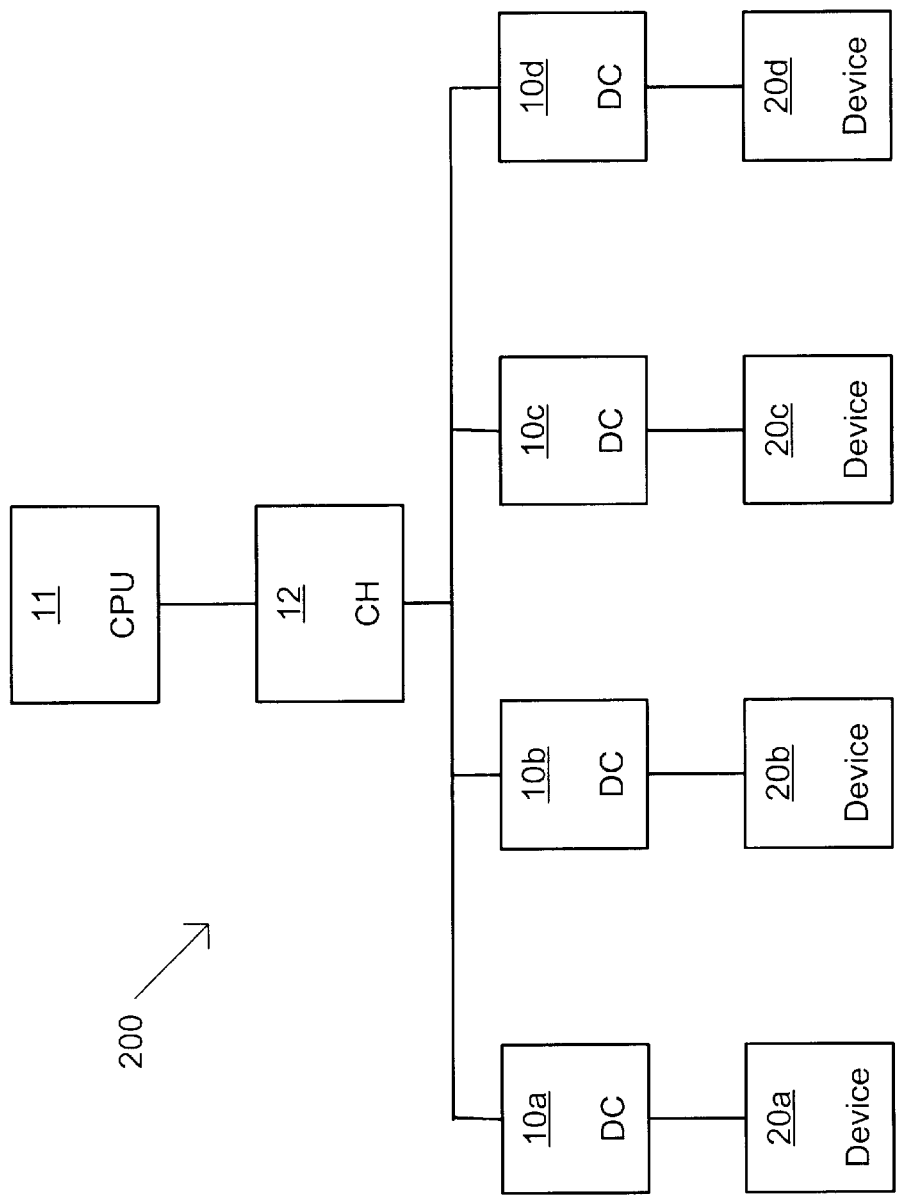
FIG. 2 shows a system with multiple devices and device controllers capable of overall management of various device operational power states.

FIG. 2 shows a system with multiple devices 20a–20d and device controllers 10a–10d, in which some or all of the controllers can include the performance management features previously described for FIG. 1. In one embodiment, CPU 11 can communicate with these device controllers through controller hub 12. Other embodiments might eliminate controller hub 12 and replace it with a direct connection between CPU 11 and device controllers 10a–10d, or replace it with another type of interface logic circuit. The specific interface logic used between CPU 11 and device controllers 10a–10d is not important to the practice of the performance management system described herein.

Because CPU 11, and the software it executes, can communicate with all the device controllers, it can determine the current device performance state of each of the various devices and place the various devices into the desired device performance states. This permits coordinated and centralized control of the overall device performance states, something that is not feasible in a conventional system in which each device operates its own performance state in relative isolation. Device performance inter-dependencies (i.e., one device cannot operate effectively in a particular first performance state when another device is in a particular second performance state) can be accommodated, and these conflicts avoided, through the centralized performance management system.

A change in the performance state of a given device can be triggered by several factors, including an event, usage demand for the device, and external conditions.

Events

An event can include the actual stimulus that may initiate a transition to a different performance state. A few examples of events are: depressing a key on a keyboard, receipt of a message over a previously idle communications link, a timeout signal from a timer, or a high-temperature alarm. An event should be discernible at the device driver level. However, the device driver may be informed of the event through various means, such as a broadcast notification, a device hardware interrupt, a software interrupt, or a timer-polled register. For example, changing the system's power source from AC power to battery power can trigger a need to change to a lower power (i.e., lower performance) state in some of the devices. This change in power source can initiate a system level interrupt, and the interrupt handler can then notify the various device drivers of the event, allowing the device drivers to initiate the actual change in the performance states of their associated devices. Events can be used to trigger a change into either a higher or lower performance state.

Usage Demand

A high performance state may be appropriate when a device is being fully utilized, so that the backlog of work can be completed quickly. However, if the device is idle, or only lightly utilized, a lower performance state can permit lower power consumption, with the slower performance being relatively unnoticeable to the user. Device usage can be monitored, with usage converted to a numerical value, which is then compared to one or more threshold values. Crossing a threshold value in one direction can initiate a transition to a higher performance state, while crossing the same or a different threshold in the opposite direction can be used to return to a lower state. The use of two different thresholds, one for each direction, can prevent thrashing between two adjacent performance states when the usage level is consistently close to a given threshold.

Usage can be monitored in various ways, such as by taking an average of recent workload and assuming the average represents the near-term workload, or by monitoring queues that feed work to the device. The device driver may track and log instantaneous and/or historical demand on the device and on device sub-systems to target the best behavioral change, given the current performance requirement demands, the rate of change of demand, and the rate of rate of change of demand. Various methods of monitoring device usage are known in the art, and are not further described here.

Usage can also be controlled to influence the demand on the device, thereby creating a closed loop system to maintain demand within certain levels. This may include:

a) Enabling or disabling certain device hardware-acceleration features to change the rate at which the workload backlog is completed.

b) Resizing buffers and queues in order to sustain an average throughput or waiting time.

c) Enabling or disabling certain optimization features within the device driver.

External Conditions

This can include conditions that are considered external to the device, but which may affect the desired performance state for that device. For example, detection of a low battery condition may require going to a lower-performance state for devices that are high power consumers, even though usage demand for these devices might otherwise dictate a higher performance state.

Policy decisions can also be considered external events. Policy considerations can include general preferences while in the various performance states, pre-defined goals of power vs. performance levels, or platform goals such as a given power budget or thermal budget. Thermal considerations are based on internal operating temperatures in the hardware, which can be monitored. Since reduced power consumption translates into lower operating temperatures, a high operating temperature may require going to a lower performance state even when other factors would normally dictate a higher performance state.

A device may also have constraints, either based on its current configuration or imposed by the device driver which accommodates future possible configurations. These constraints may negate the possibility of setting a particular performance state, or may set an upper limit on the lowest possible performance state, below which the device as configured will not function correctly. For example, a device as currently configured may have a minimum required bandwidth in order to sustain real-time memory-stream requirements, and the device may not be able to sustain these requirements when the performance state drops below a certain level.

These three triggers (events, usage, external conditions) for a performance state change should not be considered as rigidly defined groupings, but as general categories. A single trigger might fit into more than one of these categories. For example, detection of a low battery charge would be considered an external condition, but that condition might be communicated to the device driver in the form of an interrupt, which is an event. These groupings should be considered as aids in determining how to communicate the need for a performance state change, not as limitations in themselves.

The software for this process can be distributed. The device driver for each device can read from DPS status register 15 in the associated device controller and write to DPS control register 16 in that device controller. The device driver may also be able to read PPS status register 14. All the device drivers can be directed to perform these functions by centralized software, such as the operating system.

Figure 3:
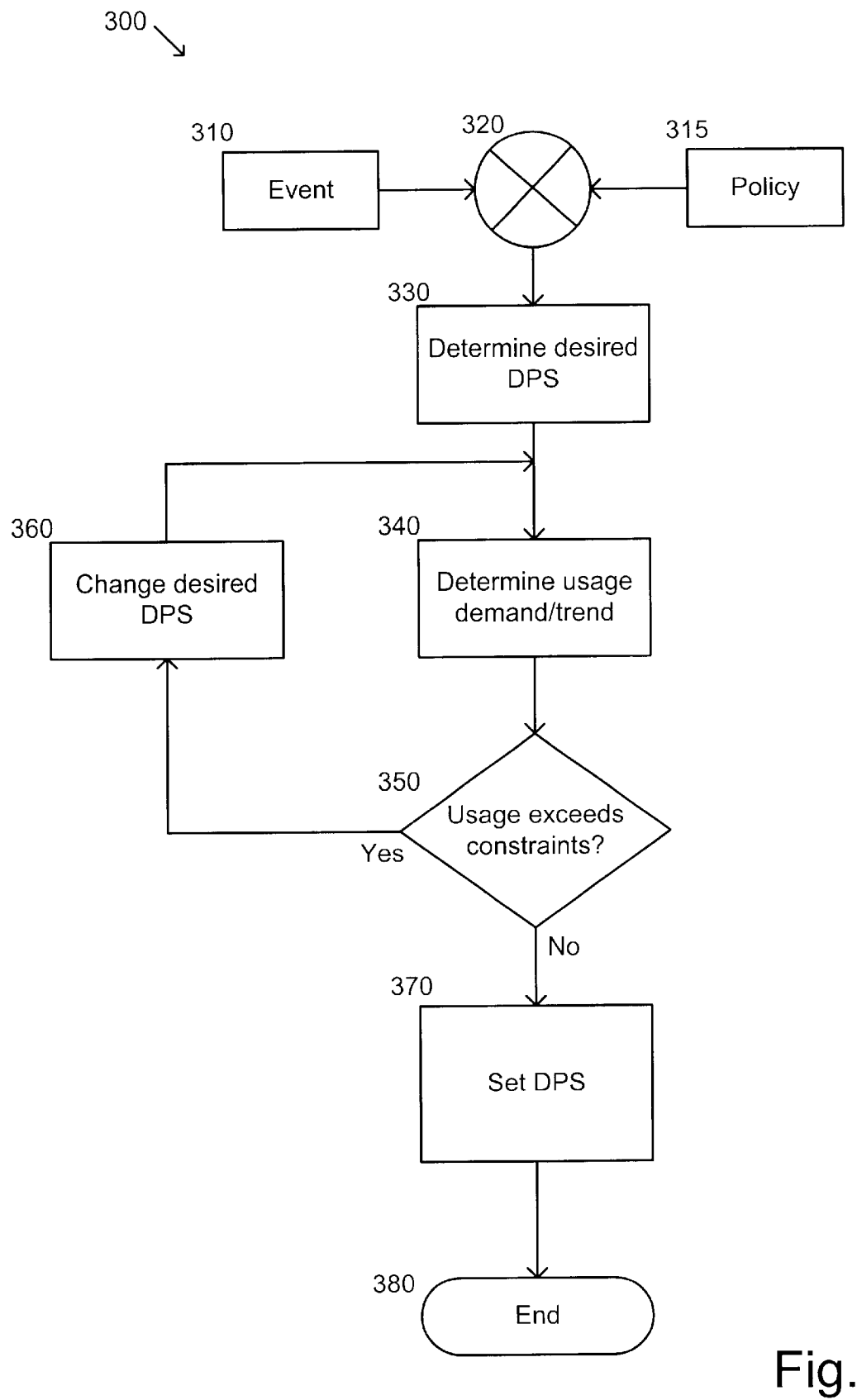
FIG. 3 shows a flow chart of a method of one embodiment.

FIG. 3 shows a flow chart 300 of one embodiment of a method of the invention, which can be implemented in software. Block 310 conceptually represents any event that might trigger a change in the desired performance state, while block 315 conceptually represents the policy considerations, such as goals and constraints, that affect the choice of permissible or desired performance states. Policy considerations can include the performance state of the processor, as indicated by PPS status register 14. These factors are combined at step 320, which can be an algorithm that sorts through the various considerations to determine the desired device performance state (DPS) at step 330. The exact nature of this algorithm can be based on the particular power requirements and device(s) in the system, and is beyond the scope of this discussion.

Once the desired DPS is determined, the usage of the device can be determined at step 340. This can be an indicator of the demand currently being placed on the device by actual usage, or a projection of imminent demand based on the usage trend. This indicator can be determined as a part of the current program flow, or can be measured separately and placed into an indicator that is read at step 340. In either case, step 350 determines if the indicated demand is outside the constraints imposed by the desired DPS. If it is, the current desired DPS can be replaced at step 360 with a different desired DPS, one that is more in line with the demand level. The same checks can then be made at steps 340 and 350 to verify the new desired DPS is proper for the usage demand that is being imposed on the device. If it is, then the desired DPS is written into the DPS control register at step 370, and the device is thereby placed in the desired device performance state.

Figure 4:
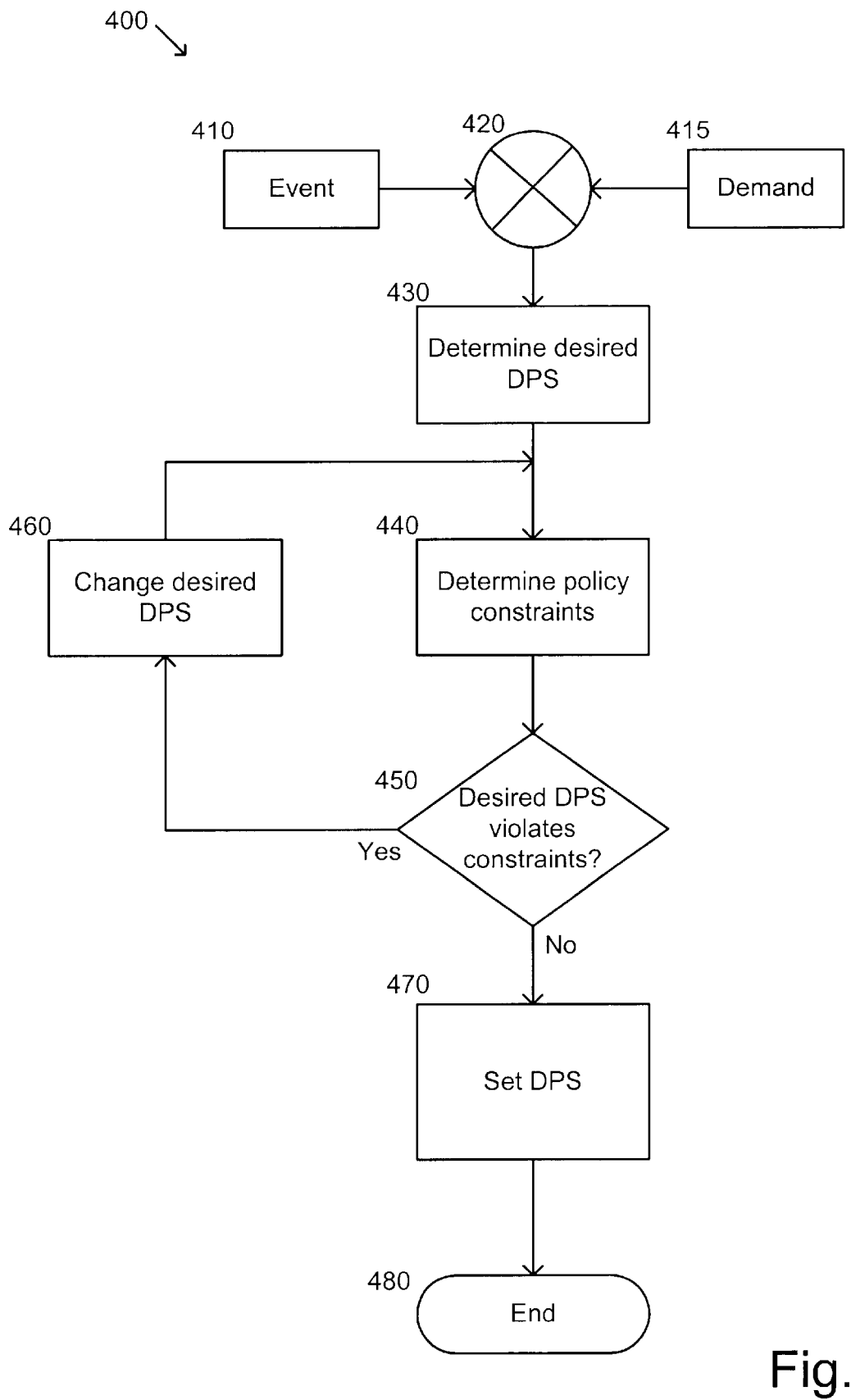
FIG. 4 shows a flow chart of a method of another embodiment.

The process of FIG. 3 implies that demand levels can override the power consumption policy. FIG. 4 shows a flow chart 400 of an embodiment in which power consumption policy considerations can override the demand levels. This process can be implemented in software. Block 410 conceptually represents any event that might trigger a change in the desired performance state, while block 415 conceptually represents an indicator of the usage demand placed on the device. This can be an indicator of the demand currently being placed on the device by actual usage, or a projection of imminent demand based on the usage trend. This indicator can be determined as a part of the current program flow, or can be measured separately and placed into an indicator that is read at step 415. These factors are combined at step 420, which can be an algorithm that sorts through the various considerations to determine the desired DPS at step 430. The exact nature of this algorithm can be based on the particular power requirements and device(s) in the system, and is beyond the scope of this discussion.

Once the desired DPS is determined, the policy constraints of the system can be determined at step 440. Step 450 determines if the desired DPS is a performance level that violates the constraints imposed by the power consumption policy. If it is, the current desired DPS can be replaced at step 460 with a different desired DPS, one that is more in line with policy considerations. The same checks can then be made at steps 440 and 450 to verify the new desired DPS is proper for the policy that is being imposed on the device. If it is, then the desired DPS can be written into the DPS control register at step 470, and the device thereby placed in the desired device performance state.

The invention can be implemented as apparatus, system, or method. The invention can also be implemented as instructions stored on a machine-readable medium, which can be read and executed by at least one processor to perform the functions described herein. A machine-readable medium includes any mechanism for storing or transmitting information in a form readable by a machine (e.g., a computer). For example, a machine-readable medium can include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. Variations will occur to those of skill in the art. Those variations are intended to be included in the invention, which is limited only by the spirit and scope of the appended claims.

We claim:

1. A device controller, comprising:

a control register to control a plurality of operational device performance states for a device;

a status register to indicate a current one of the plurality of operational device performance states for the device;

an interface coupled to the control register to facilitate a processor writing a new operational device performance state into the control register, the interface further coupled to the status register to facilitate the processor reading the current one of the plurality of operational device performance states from the status register.

2. The controller of claim 1, wherein the control register has a control field to contain one of the plurality of operational device performance states.

3. The controller of claim 1, wherein the status register has a status field to indicate the current one of the plurality of operational device performance states.

4. The controller of claim 1, further comprising:

a processor performance state status register coupled to the interface to indicate a current processor performance state of the processor.

5. A system, comprising:

a processor;

a first device; and a first device controller coupled to the processor and the first device and including a first control register to control multiple operational device performance states for the first device;

a first status register to indicate a current one of the multiple operational device performance states for the first device;

an interface coupled between the processor and the first control register to facilitate the processor writing one of the multiple operational device performance states into the first control register, the interface further coupled between the processor and the first status register to facilitate the processor reading the current one of the multiple operational device performance state from the first status register.

6. The system of claim 5, wherein the first control register has a control field to indicate the current one of plurality of operational device performance states.

7. The system of claim 5, wherein the first status register has a status field to indicate the current one of the plurality of operational device performance states.

8. The system of claim 5, further comprising:

a second device; and a second device controller coupled to the processor and to the second device, and having a second control register and a second status register.

9. The system of claim 5, further comprising:

a processor performance state status register coupled to the interface to indicate a current processor performance state of the processor.

10. A method, comprising:

determining a desired device performance state for a device from among a plurality of operational device performance states;

writing the desired device performance state into a device performance state control register; and using a content of the device performance state control register to control a performance state of a device.

11. The method of claim 10, wherein determining is preceded by an occurrence of an event that changes the desired device performance state.

12. The method of claim 10, further comprising modifying the desired device performance state based on policy considerations.

13. The method of claim 10, further comprising modifying the desired device performance state based on usage demand on the device.

14. The method of claim 10, wherein each of the plurality of device performance states is based on operating performance versus power consumption.

15. The method of claim 10, wherein determining includes:

reading a processor performance state from a processor performance state register; and restricting the plurality of device performance states to device performance states permitted for the processor performance state.

16. A machine-readable medium having stored thereon instructions, which when executed by a processor cause said processor to perform:

determining a desired device performance state for a device from among a plurality of operational device performance states; and writing the desired device performance state into a device performance state control register to control a performance state of a device.

17. The medium of claim 16, wherein determining is preceded by an occurrence of an event that changes the desired device performance state.

18. The medium of claim 16, further comprising modifying the desired device performance state based on policy considerations.

19. The medium of claim 16, further comprising modifying the desired device performance state based on usage demand on the device.

20. The medium of claim 16, wherein each of the plurality of device performance states is based on operating performance versus power consumption.

21. The medium of claim 16, wherein determining includes:

reading a processor performance state from a processor performance state register; and restricting the plurality of device performance states to device performance states.

* * * * *

UNITED STATES PATENT AND TRADEMARK OFFICE
CERTIFICATE OF CORRECTION

PATENT NO. : 6,704,877 B2
DATED : March 9, 2004
INVENTOR(S) : Cline et al.

It is certified that error appears in the above-identified patent and that said Letters Patent is hereby corrected as shown below:

Column 7,
Line 52, before "plurality", insert -- the --.

Column 8,
Line 60, insert -- permitted for the processor performance state -- at the end of line.

Signed and Sealed this

Fifteenth Day of June, 2004

JON W. DUDAS
*Acting Director of the United States Patent and Trademark Office*